United States Patent [19]

Perez

[11] 4,278,185
[45] Jul. 14, 1981

[54] DOUBLE TEN CIGARETTE DISPENSER

[76] Inventor: Sergio J. Perez, 311 W. 97th St., Apt. 3E, New York, N.Y. 10025

[21] Appl. No.: 59,042

[22] Filed: Jul. 19, 1979

[51] Int. Cl.³ .................. A24F 15/04; B60N 3/12
[52] U.S. Cl. .................................. 221/104; 221/186; 221/198; 221/232
[58] Field of Search ............... 221/103, 104, 106, 198, 221/232, 186, 188, 190, 191, 195, 228, 229, 246, 255, 143–149

[56] References Cited

U.S. PATENT DOCUMENTS

| 2,069,678 | 2/1937 | Peters ................................ 221/103 |
| 3,100,060 | 8/1963 | Calixto ............................. 221/188 X |
| 3,845,881 | 11/1974 | Sachko ............................. 221/144 |

Primary Examiner—F. J. Bartuska

[57] ABSTRACT

A cigarette dispenser for placement on top of an automobile dashboard, and including a frame in which a cigarette case is slidable; the case containing two rows of cigarettes, one above the other, and each row containing ten cigarettes; the case having two dispensing outlets, one for each row, and the frame having a push rod for pushing a cigarette out of the case, and each row of cigarettes being spring pushed for aligning the cigarettes in succession with the dispensing outlets.

2 Claims, 6 Drawing Figures

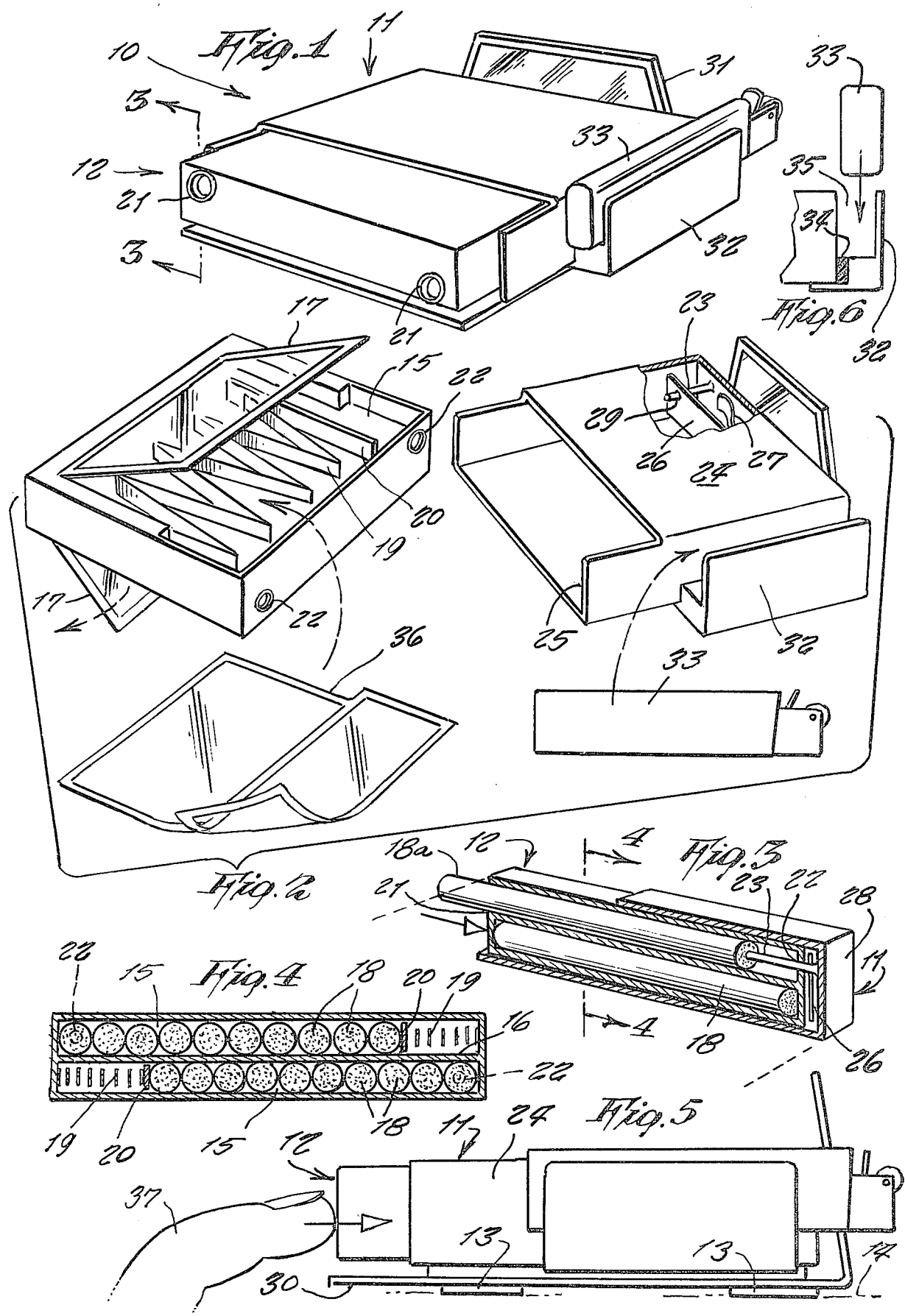

DOUBLE TEN CIGARETTE DISPENSER

SUMMARY OF THE INVENTION

This invention relates generally to automobile accessories and more specifically to cigarettes dispenser.

It is well known that a motorist fumbling for a cigarette in a pocket or purse is dangerous while driving, because it is difficult to accomplish the same with one hand, while the other hand holds the steering wheel, and the motorist eyes maybe momentarily diverted from the road while looking for a cigarette and or in opening the cigarette pack. This situation is accordingly in need of an improvement.

Therefore, it is a principle object of the present invention to provide a cigarette dispenser placed on top of the dashboard where the motorist can easily reach for a cigarette with one hand without diverting his or her eyes from the road, so this cigarette dispenser promotes highway safety.

Another object is to provide a cigarette dispenser that two short rows of ten cigarettes, thereby the dispenser is relatively short and does not block out a full view through the windshield.

BRIEF DESCRIPTION OF THE DRAWING

FIG. 1 is a perspective view of the invention.

FIG. 2 is a view showing the components thereof separated.

FIG. 3 is a cross sectional perspective view taken on line 3—3 of FIG. 1, and illustrated in a depressed condition showing how a cigarette is ejected.

FIG. 4 is a cross sectional view taken on line 4—4 of FIG. 3.

FIG. 5 is a side view of the invention shown with finger positioned to push in the cigarette cartridge.

FIG. 6 shows a cigarette lighter being placed in the lighter receptacle.

PREFERRED EMBODIMENT

Referring now to the drawing in greater detail. The reference numeral 10 represents a double ten cigarette dispenser according to the present invention, wherein there is a frame 11 and a cigarette case 12 that is slidable into the frame. The frame includes rubber pads 13 on its under-side, so as to rest upon a top surface 14 of an automobile dashboard.

In this invention, the case includes upper and lower compartments 15 separated by a partition 16 therebetween, and each compartment is accessible by a pivoted door 17 which maybe loaded with ten cigarettes 18 placed in a row. A compression leaf spring 19 inside one end of each compartment is attached to a pressure plate 20 which pushes the cigarettes towards the opposite end of the compartment, so that an end most cigarette 18a aligns between a dispensing outlet 21 on the cases front wall, and a hole 22 on the cases rear wall.

It is to be noted that both holes 22 are not located at a same end of the cases rear wall, but are located near opposite ends instead, thereby at diagonally opposite corners thereof, and which permits the case to be placed into the frame with either compartment 15 being on top of the other, in order that one of the holes 22 aligns with a push rod 23 inside one corner of the frame.

The frame includes a receptacle 24 that is closed on all sides, except for an opening 25 at its front in order to allow inserting the case 12 therein. A pressure plate 26 inside the receptacle is attached to a leaf spring 27 bearing against the receptacles rear wall 28. A hole 29 through the pressure plate allows the push rod attached to the rear wall to protrude forwardly therethrough. The receptacle is mounted on a plate 30 having the pads 13 therebelow; a rear end of the plate being upwardly bent to form a decorative transparent rear panel 31. A clip 32 on one side of the receptacle serves to hold a cigarette lighter 33, in order to be handy for use. A strechable rubber shim 34 between the clip and receptacle side walls, allows the clip to move sidewardly and thus permits a wider lighter to fit into the space 35.

Both the frame and cigarette case are made of transparent hard plastic attractively decorated. In use, after ten cigarettes are loaded into each compartment, and a flexible transparent plastic cover sheet 36 is inserted under the door 17, the case is then slid into the receptacle until it abuts against the pressure plate 26. When a motorist wishes a cigarette he simply pushes the case with a finger 37, and the case slides against the action of spring 27, and the push rod 23 enters hole 22 pushing the cigarette at the end partly out the dispensing outlet, then releases pushing the case, causing spring 27 to push the case forwardly again, so that the push rod is withdrawn outwardly therefrom. Motorist then grasps the exposed end of the cigarette and pulls it completely out for use. The spring 19 then causes the next cigarette to move into a dispensing position.

It is understood that various changes maybe made in the construction; such changes being made within the scope of the appended claims.

I claim:

1. A double ten cigarette dispenser, comprising in combination; a frame for placement on top of an automobile dashboard, and a cigarette case that is slid rearwardly into said frame with either upper opposite or lower opposite side of said case facing upwardly in said frame; said case comprising two compartments, one upon another separated by a partition therebetween; each compartment holding a row of ten cigarettes, and each compartment being accessible for re-loading cigarettes therein by pivoted doors on opposite sides of said case; said frame comprising a receptacle mounted upon a plate fitted with rubber pads therebeneath for resting upon said dashboard; said receptacle having an opening at a front thereof for slidably receiving said case, and a forwardly extending push rod near one corner of a rectangular rear wall of said receptacle; and said case having a pair of holes near opposite diagonal corners of a rectangular rear wall thereof, and being selectively entered by said push rod when said case is slid in said frame with either said case upper or lower side thereof facing upwardly for alignment with said push rod, and a spring loaded pressure plate in front of said receptacle rear wall, normally urging said case away from said push rod.

2. The combination as set forth in amended claim 1; wherein each said compartment of said case includes a cigarette dispensing opening on a rectangular front wall of said case, said dispening openings located diagonally at opposite corners of said front wall, and each being aligned with one of said holes on the opposite said rear wall of said case for receiving said push rod; whereby a cigarette in a position between said push rod receiving hole and said dispensing opening is pushed by said push rod outwardly of said opening; then when said case is pushed against said pressure plate, and each said compartment contains a second said spring loaded pressure plate urged against said row of ten cigarettes, so that each said cigarette in succession is moved into said position between push rod receiving hole and said cigarette dispensing opening.

* * * * *